US010024557B2

(12) United States Patent
Zazueta et al.

(10) Patent No.: US 10,024,557 B2
(45) Date of Patent: Jul. 17, 2018

(54) WATER EXTRACTOR DEVICE USING SCUPPERS

(71) Applicant: HONEYWELL INTERNATIONAL INC., Morristown, NJ (US)

(72) Inventors: Marco A. Zazueta, Mexicali (MX); Mark Fewell, Riverside, CA (US); Michael Faust, Redondo Beach, CA (US); James L. Nguyen, Westminster, CA (US); Benjamin Hernandez, Mexicali (MX)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 530 days.

(21) Appl. No.: 14/826,913

(22) Filed: Aug. 14, 2015

(65) Prior Publication Data

US 2017/0045243 A1  Feb. 16, 2017

(51) Int. Cl.

| F24F 3/14 | (2006.01) |
|---|---|
| F24F 11/00 | (2018.01) |
| G05D 3/14 | (2006.01) |
| F25D 21/00 | (2006.01) |
| F25D 21/14 | (2006.01) |
| F24F 3/153 | (2006.01) |
| B60H 3/02 | (2006.01) |

(Continued)

(52) U.S. Cl.
CPC ............ *F24F 3/1405* (2013.01); *F24F 3/153* (2013.01); *B60H 1/3207* (2013.01); *B60H 3/024* (2013.01); *F28D 2021/0038* (2013.01)

(58) Field of Classification Search
CPC .. F25F 3/14; F25F 3/1405; F25F 3/153; F25F 6/00; F25F 2221/54; B60H 1/3207; B60H 3/024; F28D 1/0408; F28D 2021/0038; F28D 9/0025
See application file for complete search history.

(56) References Cited

U.S. PATENT DOCUMENTS

| 3,849,095 A | 11/1974 | Regehr |
| 4,187,090 A | 2/1980 | Bizzarro et al. |

(Continued)

FOREIGN PATENT DOCUMENTS

EP   0330704 B1   4/1993

OTHER PUBLICATIONS

Richard W. Smith, Zero-G Water Selection Separator: A Performance Tradeoff, Society of Automotive Engineers, Inc., 690642, New York, NY.

(Continued)

*Primary Examiner* — Ned Landrum
*Assistant Examiner* — Daniel C Comings
(74) *Attorney, Agent, or Firm* — Shimokaji IP

(57) ABSTRACT

A heat exchange system includes a core of cross flow passages having a reheater, and a condenser that is downstream of and directly interfaces the reheater. A first water extractor is downstream of the condenser, wherein the first water extractor turns a first fluid from the first pass of the condenser back towards the condenser and produces a second fluid that flows into the second pass of the condenser. A second water extractor is downstream the condenser, wherein the second water extractor turns a third fluid from the second pass of the condenser towards the reheater; and produces a fourth fluid that flows into the reheater.

19 Claims, 4 Drawing Sheets

(51) Int. Cl.
　　　*F28D 21/00*　　　(2006.01)
　　　*B60H 1/32*　　　(2006.01)

(56) References Cited

U.S. PATENT DOCUMENTS

| | | | |
|---|---|---|---|
| 5,887,445 A | | 3/1999 | Murry et al. |
| 6,128,909 A | * | 10/2000 | Jonqueres .............. B64D 13/06 |
| | | | 62/402 |
| 6,148,622 A | * | 11/2000 | Sanger ................... B64D 13/06 |
| | | | 62/402 |
| 6,381,969 B1 | | 5/2002 | Afeiche et al. |
| 6,981,388 B2 | | 1/2006 | Brutscher et al. |
| 8,444,732 B2 | | 5/2013 | Bratton |

OTHER PUBLICATIONS

James Siegel, Dehumidification and Reheat in One Coil, Mar. 2004, http://www.achrnews.com/articles/89890-dehumidification-and-reheat-in-one-coil.
Munters, DF4800 Product Sheet, 2005.

* cited by examiner

WATER EXTRACTOR DEVICE USING SCUPPERS

BACKGROUND OF THE INVENTION

The present invention generally relates to apparatus and methods for the treatment of airstreams in an environmental control system (ECS) and, more particularly, to remove humidity from airstreams using an integrated heat exchanger system having a water extraction device.

In an aircraft environmental control system, humidity must be removed from the air prior to delivery to the pressurized cabin or equipment/electronics. The humidity can be removed by cooling the air below the water saturation temperature in reheater and condenser heat exchangers thus condensing most of the water vapor in the air into droplets. The droplets must then be separated from the air before the air is recuperatively heated in the reheater, and expanded and cooled in the cooling turbine.

Past high pressure water extraction loop designs include a condenser, a reheater, and a water extractor. However, the designs can be large, heavy, have many parts and components, and typically provide an installation challenge in many ECS applications. It is difficult to package the length required for current water extractor designs. The following are some examples.

U.S. Pat. No. 6,981,388 describes an overall water separation system that includes a reheater, condenser, and water separator. The patent also describes two sets of heat exchangers and water extractors. The airflow of each set goes through a reheater, condenser, water extractor and reheater.

U.S. Pat. No. 6,381,969 describes a two-spool environmental control system with two separator water extractors. One water extractor is downstream of the condenser and upstream of the high pressure turbine. The other water extractor is downstream of the high pressure turbine and before the reheater.

U.S. Pat. No. 5,887,445 describes a two-spool system that uses a standard high pressure water separation assembly. There are no details with respect to the water extractor function. Only one water removal device is used in this patent.

U.S. Pat. No. 6,128,909 describes an ECS with two-stage compression and the use of a subcooler between the first turbine and the second turbine. The patent describes water removal but does not describe how it is done.

U.S. Pat. No. 4,187,090 describes specific features in a regenerative heat exchanger pan (i.e., hot air outlet header) that guides the airflow, captures water droplets, collects water droplets, and drains water droplets through a drain tube. The patent describes a single baffle and scupper, and the scupper can have holes or slots. The patent describes a single staged device.

U.S. Pat. No. 3,849,095 describes a baffle/scupper geometry that can be used in a gas/liquid separator. The patent is specific with respect to baffle and scupper geometry where the crest of one baffle reaches toward the trough of the confronting baffle.

U.S. Pat. No. 8,444,732 describes a device for removing solid and liquid particles from a gaseous stream. It describes the use of identical modular components. The geometry includes pockets within the vane device to capture solids and liquids. The patent is specific with respect to vane geometry.

"Zero-G Water Selection Separator: A Performance Tradeoff" by R. Smith describes a zero-gravity application using finned surfaces coated with a cellular material that "wicks" the water away from the airstream.

"Dehumidification and Reheat in One Coil" by J. Siegel describes a low pressure device using refrigeration and heat coils to cool and condense entrained moisture in the air and then reheat.

As can be seen, there is a need for an improved heat exchanger system that includes water extraction.

SUMMARY OF THE INVENTION

In one aspect of the present invention, a heat exchange system comprises a reheater having: a humidified air inlet face; a humidified air outlet face; a dehumidified air inlet face; a dehumidified air outlet face; a condenser having: a reheated air inlet face that directly interfaces the reheater humidified air outlet face; a condensed air outlet face; a dehumidified air inlet face; a dehumidified air outlet face; a first water extractor having: a condensed air inlet face that directly interfaces the condenser condensed air outlet face; a dehumidified air outlet face that directly interfaces the condenser dehumidified air inlet face; a second water extractor having: a condensed air inlet face that directly interfaces the condenser dehumidified air outlet face; a dehumidified air outlet face.

In another aspect of the present invention, a heat exchange system comprises a core of cross flow passages having: a reheater; and a condenser that is downstream of and directly interfaces the reheater; a first water extractor downstream of the first pass of the condenser, wherein the first water extractor: turns a first fluid from the first pass of the condenser back towards the second pass condenser face; and produces a second fluid that flows into the second pass of the condenser; a second water extractor downstream of the second pass of the condenser, wherein the second water extractor: turns a third fluid from the condenser towards the reheater; and produces a fourth fluid that flows into the reheater.

In yet another aspect of the present invention, a heat exchange system comprises a core of cross flow passages having: a reheater; and a condenser that is downstream of and directly interfaces the reheater; a first water extractor that is downstream of and directly interfaces the condenser, wherein the first water extractor includes: a plurality of first walls; a plurality of first ramp elements on one side of the plurality of first walls; and a plurality of first hook elements on an opposite side of the plurality of first walls; a second water extractor that is downstream of and directly interfaces the condenser, and is upstream of and directly interfaces the reheater, wherein the second water extractor includes: a plurality of second walls; a plurality of second ramp elements on one side of the plurality of second walls; and a plurality of second hook elements on an opposite side of the plurality of second walls.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the term "air" is intended to encompass the broader term "fluid". Thus, the term "air" and "fluid" are intended to be interchangeable.

The present invention generally provides an integrated heat exchange system whereby a core of cross-flow heat exchange passages are shared by a reheater and a condenser. A first water extractor is directly downstream of a first pass of the condenser and directly interfaces the condenser so that fluid lines are eliminated between the condenser and the first water extractor. The first water extractor extracts humidity in the fluid (i.e., air) from the condenser. Concurrently, the first water extractor turns the humidified fluid back towards and into a second pass of the condenser. A second water extractor is directly downstream of the condenser and further extracts humidity in the fluid from the condenser. The second water extractor turns the further dehumidified fluid towards and into the reheater.

As a result of the integration of the components herein, space requirements for a heat exchange system can be reduced by about 30% to about 50% of the volume of space otherwise required by past heat exchange system designs. The number of parts is reduced by about 40% to about 70%. The number of connections is reduced by about 25% to about 50%.

Figure 1A:
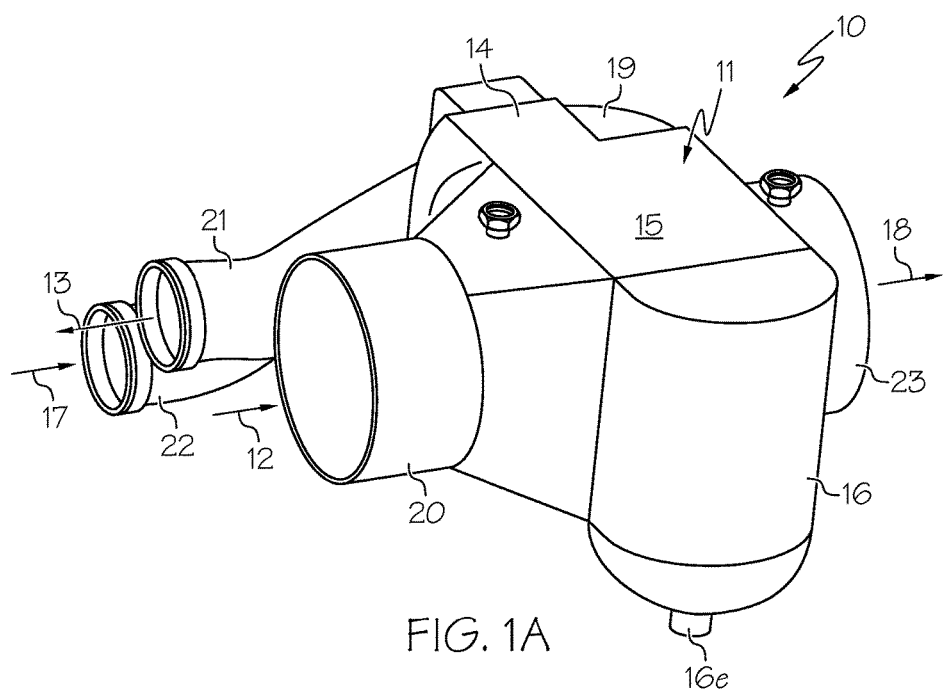
FIG. 1A is a perspective view of a heat exchange system according to an exemplary embodiment of the present invention.
Figure 1B:
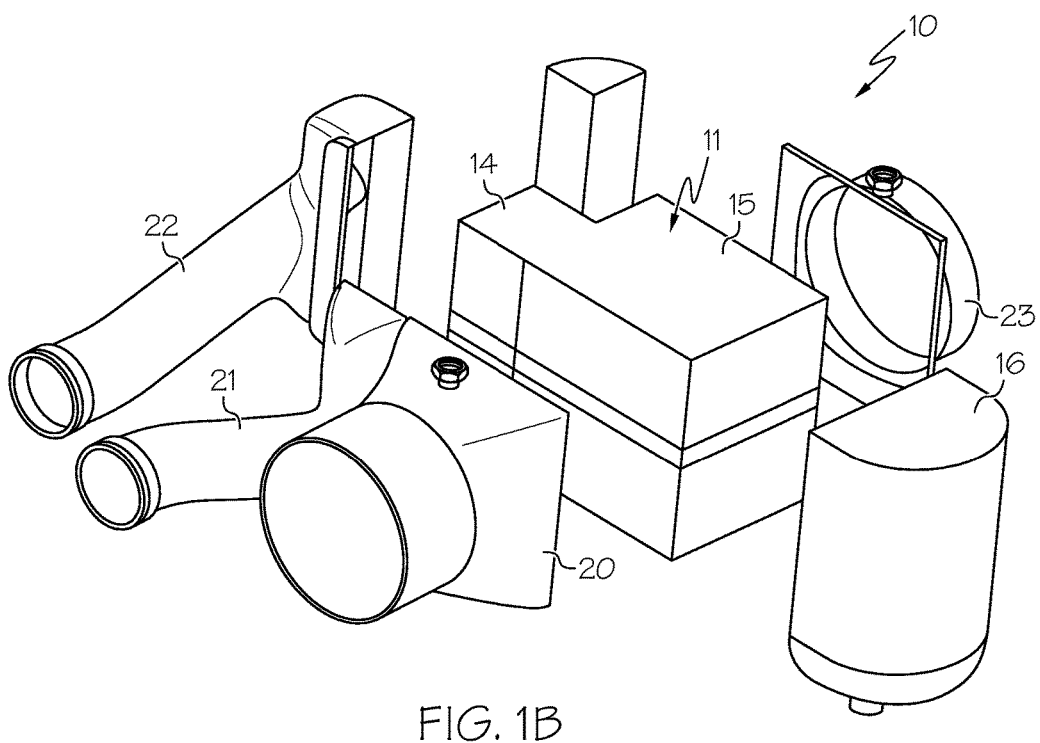
FIG. 1B is an exploded view of FIG. 1A.

In FIGS. 1A-1B, a heat exchange system 10 is shown according to an exemplary embodiment of the present invention. The system 10 may include a core 11 (that includes a reheater 14 and a condenser 15), a first water extractor 16, and a second water extractor 19.

The core 11 may include cross flow heat exchange passages. The core 11 can include common fins, bars, tube sheets and separator plates as known in the art.

The core 11 may include a shared portion 11a and a non-shared portion 11b, in an exemplary embodiment. For example, the shared portion 11a may be a portion of the core 11 wherein different components (or parts thereof) of the heat exchange system 10 may share common heat exchange passages. In the non-shared portion 11b, different components of the heat exchange system 10 may not share common heat exchange passages.

In an embodiment, the shared portion 11a may include the reheater 14 and the condenser 15, each of which are in defined portions of the core 11 but share some of the same heat exchange passages. In other words, one or more heat exchange passages may extend through the reheater 14 and the condenser 15, wherein each of the passages may have two operational segments (though not physically segmented). One operational segment may function as part of a reheater and another operational segment may function as part of a condenser.

Figure 2:
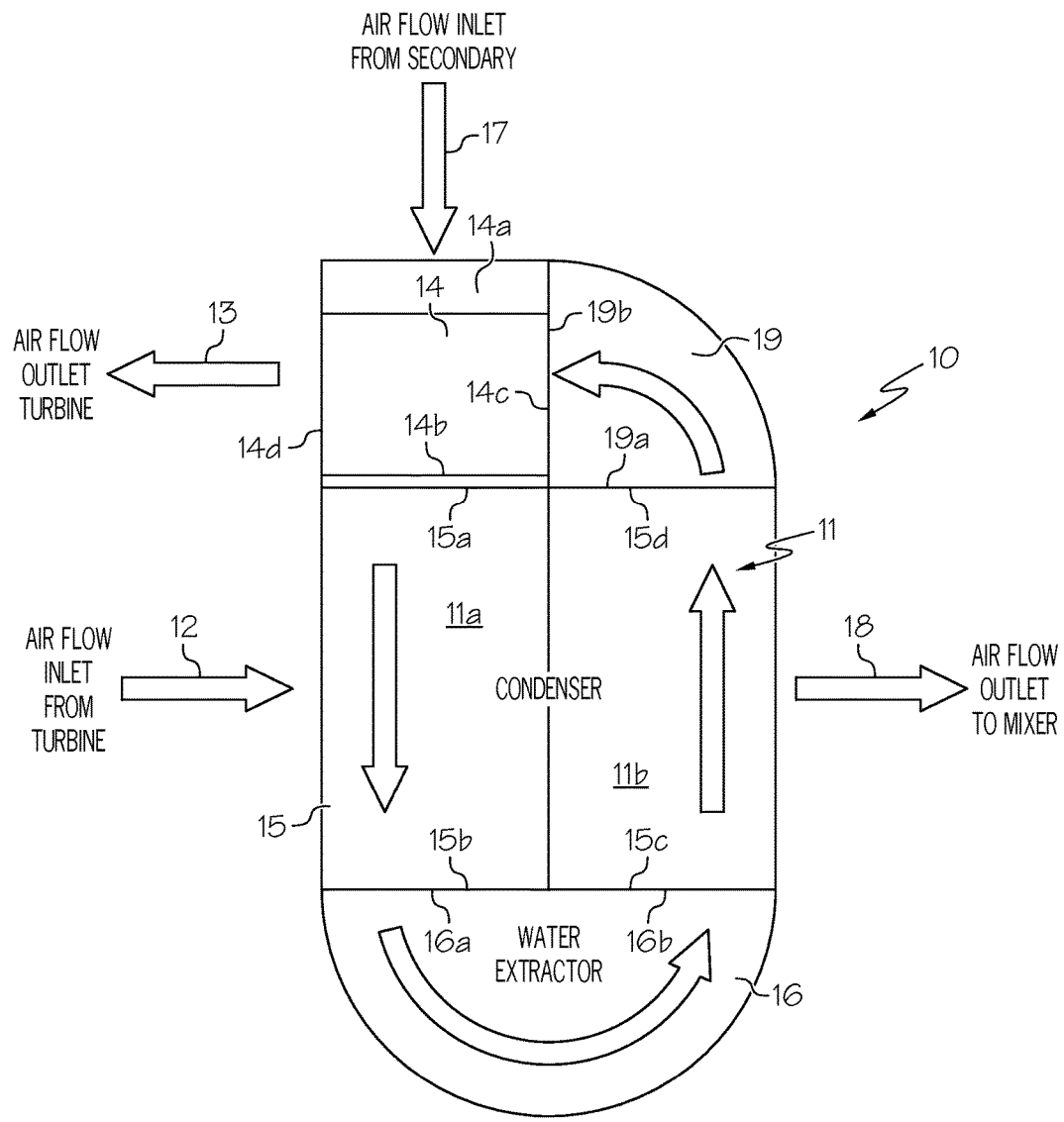
FIG. 2 is a schematic view of the heat exchange system of FIGS. 1A-1B.

As shown in FIG. 2, the reheater 14 can operate on a cross flow of air (i.e., fluids) in heat exchange passages, as in known in the art. The reheater 14 may include a humidified air inlet face 14a, a humidified air outlet face 14b, a dehumidified air inlet face 14c, and a dehumidified air outlet face 14d. Each of the foregoing faces may generally represent a plane or planar area that may define one or more of the boundaries or perimeters of the reheater 14.

The humidified air inlet face 14a may connect to an air inlet or manifold 22 which may receive a humidified inlet air 17, such as air from a secondary heat exchanger of an aircraft ECS. Upon the humidified air 17 in the reheater 14 undergoing heat exchange, the humidified air outlet face 14b may pass reheater humidified air into the condenser 15.

At the same time, the dehumidified air inlet face 14c of the reheater 14 may receive further dehumidified air from the second water extractor 19 described below. The reheater 14 can heat the dehumidified air and pass it through the dehumidified air outlet face 14d. Heated, dehumidified air 13 may flow into an air outlet or manifold 21, and then to a turbine, for example, of an ECS of an aircraft.

The condenser 15 can operate on a cross flow of fluids in the heat exchange passages as in known in the art. The condenser 15 may be directly downstream of the reheater, and may include a reheater air inlet face 15a, a condensed air outlet face 15b, a dehumidified air inlet face 15c, and a dehumidified air outlet face 15d (FIG. 2). Each of the foregoing faces may generally represent a plane or planar area that may define one or more of the boundaries or perimeters of the condenser 15.

The reheated air inlet face 15a of the condenser 15 may directly interface the humidified air outlet face 14b of the reheater 14. In other words, 15a is directly face-to-face with 14b in the absence of fluid connection lines otherwise used when a reheater and condenser are not integrated as a single component as in past designs. The reheated air inlet face 15a of the condenser 15 may receive humidified air from the reheater 14.

The condenser 15 may condense the humidified air from the reheater 14. This may occur via heat exchange with an inlet air 12, such as from a turbine of an aircraft ECS. The inlet air 12 may pass into an air inlet or manifold 20 that is connected to the condenser 15. Condensed air may then exit from the condenser 15, via the condensed air outlet face 15b.

As mentioned above, the condenser 15 can share heat exchange passages with the reheater 14. As depicted in FIG. 2, the sharing of heat exchange passages, in this exemplary embodiment, is only partial. The heat exchange passages that carry inlet air 17 through the reheater 14 can extend all through the condenser 15 and up to the first water extractor 16 described below. However, the cross flow passages of the condenser 15 that receive the inlet air 12 may not be shared with the reheater 14. Likewise, the condenser 15 passages that receive dehumidified air from the first water extractor 16 may not be not shared with the reheater 14. And the passages in the reheater 14, that receive flow from the second water extractor 19 described below, may not be shared with the condenser 15.

The first water extractor 16, of the heat exchange system 10, may be directly downstream of the condenser 15, and may include a condensed air inlet face 16a and a dehumidified air outlet face 16b (FIG. 2). Each of the foregoing faces may generally represent a plane or planar area that may define the boundaries or perimeters of the water extractor 16.

The condensed air inlet face 16a of the water extractor 16 may directly interface the condensed air outlet face 15b of the condenser 15. In other words, 16a is directly face-to-face with 15b in the absence of fluid connection lines between them. The condensed air inlet face 16a of the water extractor 16 may receive condensed water and air from the condenser 15.

Figure 3:
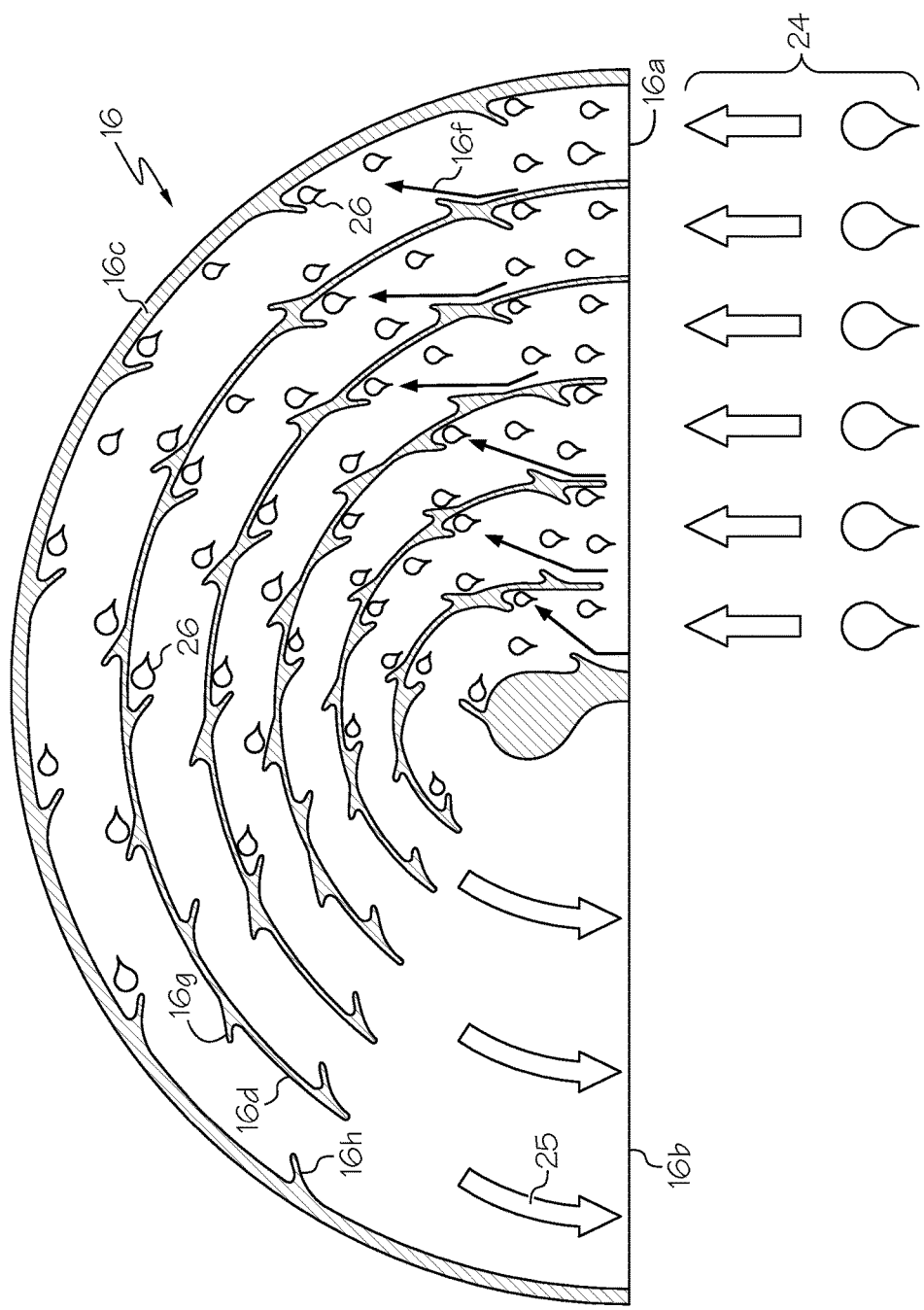
FIG. 3 is a schematic view of a water extractor according to an exemplary embodiment of the present invention.

As shown in FIG. 3, the first water extractor 16 may, upon receiving the condensed water and air 24, turn the condensed water and air 24 back towards the condenser 15. In this exemplary embodiment, the condensed water and air 24 may be turned 180°, or substantially about 180°. Concurrently as the condensed water and air 24 is turned, the water extractor 16 can remove condensed water from the air, via inertia.

The first water extractor 16 may include a first outer wall 16c. A plurality of first hook elements or scuppers 16h may be affixed to the interior of the first outer wall 16c. In various embodiments, the first hook elements 16h may or may not be equally spaced from one another. The first hook elements 16h may have a hook configuration with a concave surface that faces opposite to the direction of flow of the incoming condensed water and air 24. The first hook elements 16h may serve to hook or capture water droplets 26 as the condensed water and air 24 flows by the hook elements 16h. The hooked water droplets 26 may then fall, by gravity, into a drain 16e.

The first water extractor 16 may also include a plurality of first interior walls 16d that are radially inward of the first outer wall 16c. The first interior walls 16d may be curved and may be concentric to one another. In various embodiments, the first interior walls 16d may or may not be equally spaced, radially, from one another. One or more of the first interior walls 16d may have, on one side thereof, a plurality of hook elements or scuppers 16h that may function in a manner similar to those on the outer wall 16c.

On an opposite side of one or more of the first interior walls may be a plurality of first ramp elements 16g. The first ramp elements 16g may allow the incoming condensed water and air 24 to flow across their surfaces and to be directed in directions 16f. The directions 16f may be towards an adjacent wall 16d and, more particularly, towards a hook element 16h on an adjacent wall 16d.

Water droplets may collect immediately downstream of ramp 16g and allow the water droplets to fall into the drain 16e.

As with the first hook elements 16h on the interior walls 16c, the first ramp elements 16g may or may not be equally spaced from one another. Moreover, any given ramp element 16g may or may not be directly opposite a respective hook element 16h on a respective interior wall 16c. The first hook elements 16h on the interior walls 16c also hook water droplets 26 and allow them to fall into the drain 16e.

Turning back to FIGS. 2 and 3, dehumidified air 25 from the first water extractor 16 exits, via the dehumidified air outlet face 16b, and flows back into the condenser 15 that is directly downstream of the first water extractor 16. The dehumidified air inlet face 15c of the condenser 15 directly interfaces (i.e., is directly face-to-face with) the dehumidified air outlet face 16b of the water extractor 16. Thereby, at such interface, no flow connection lines are needed between the first water extractor 16 and the condenser 15.

In the condenser 15, the dehumidified air may undergo heat exchange with the inlet air 12, and exit as outlet air 18, via an air outlet or manifold 23. The outlet air 18 may flow to a mixer, for example, of an ECS of an aircraft. The dehumidified air may exit the condenser 15 as condensed, dehumidified air, via the dehumidified air outlet face 15d.

A second water extractor 19 can be directly downstream of and directly interfacing the condenser 15. A condensed air inlet face 19a of the water extractor 19 may be directly face-to-face with the dehumidified air outlet face 15d of the condenser 15. Thereby, flow lines are eliminated between the water extractor 19 and the condenser 15.

Figure 4:
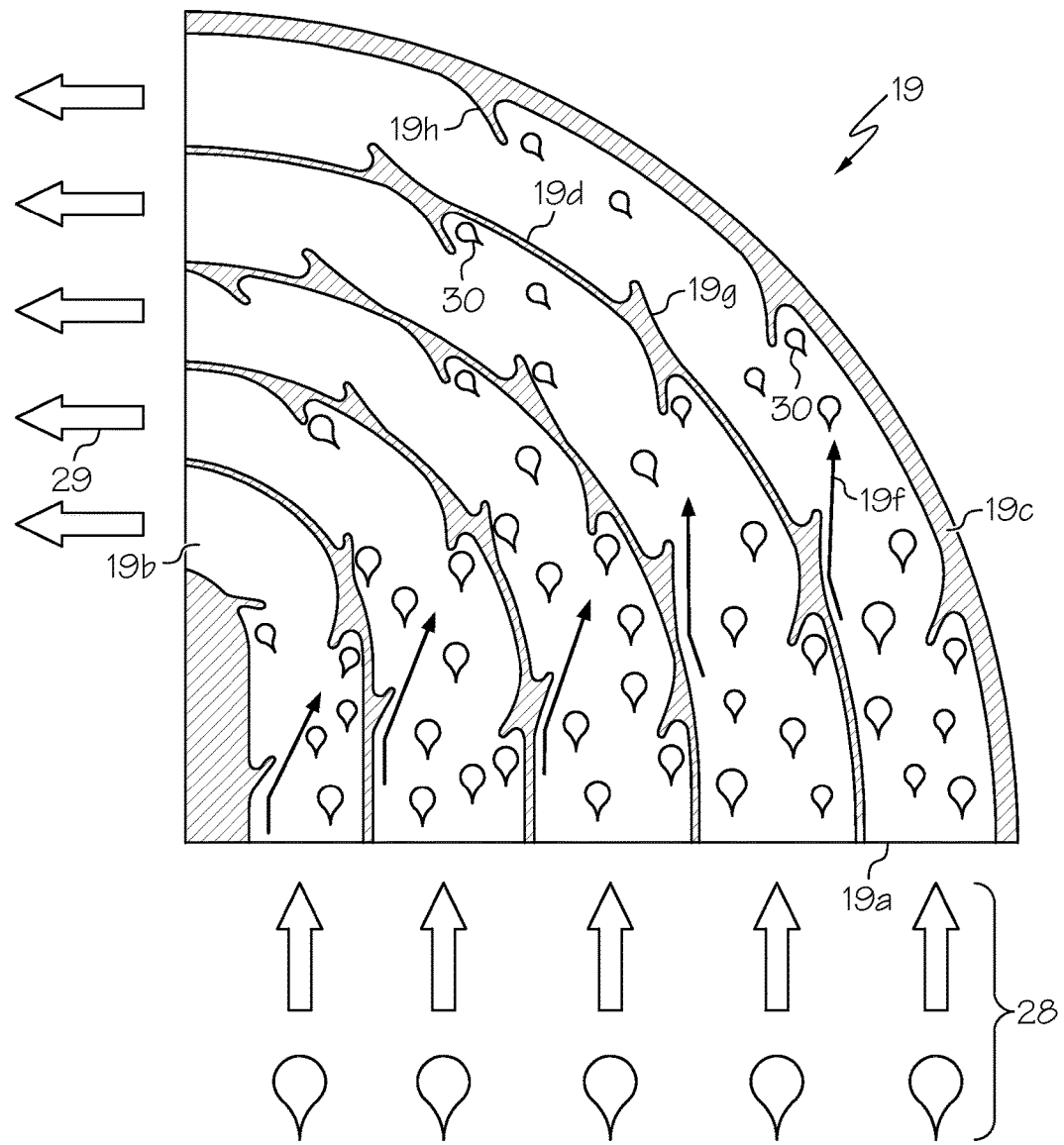
FIG. 4 is a schematic view of another water extractor according to an exemplary embodiment of the present invention.

In FIG. 4, the second water extractor 19 can be similar in design and function to the first water extractor 16. Upon receiving the dehumidified, condensed water and air 28 from the condenser 15, the second water extractor 19 can turn the condensed water and air 28 which, in this case, is towards the reheater 14. In this exemplary embodiment, the condensed air 28 can be turned 90°, or substantially about 90°. Concurrently as the condensed water and air 28 is turned, the water extractor 19 can remove water from the condensed water and air, via inertia.

The second water extractor 19 may include a second outer wall 19c. A plurality of second hook elements or scuppers 19h may be affixed to the interior of the outer wall 19c. The second hook elements 19h may or may not be similar in design to the first hook elements 16h. In various embodiments, the second hook elements 19h may or may not be equally spaced from one another. The second hook elements 19h may have a hook configuration with a concave surface that faces opposite to the direction of flow of the incoming condensed water and air. The second hook elements 19h may serve to hook capture water droplets 30 as the condensed water and air flows by the second hook elements 19h. The hooked water droplets 30 may then fall, by gravity, into a drain (not shown).

The second water extractor 19 may also include a plurality of second interior walls 19d that are radially inward of the outer wall 19c. The second interior walls 19d may be curved and may be concentric to one another. In various embodiments, the second interior walls 19d may or may not be equally spaced, radially, from one another. One or more of the second interior walls 19d may have, on one side thereof, a plurality of second hook elements or scuppers 19h that function in a manner similar to those on the outer wall 19c.

On an opposite side of one or more of the second interior walls may be a plurality of second ramp elements 19g. The second ramp elements 19g may or may not be similar in design to the first ramp elements 16g. The second ramp elements 19g may allow the incoming condensed water and air to flow across their surfaces and then be directed in directions 19f. The directions 19f may be towards an adjacent wall 19d and, more particularly, towards a hook element 19h on an adjacent wall 19d.

Water droplets may collect immediately downstream of ramp 19g and allow the water droplets to fall by gravity into the drain (not shown).

As with the second hook elements 19h on the interior walls 19c, the second ramp elements 19g may or may not be equally spaced from one another. Moreover, any given ramp elements 19g may or may not be directly opposite a respective hook element 19h on a respective interior wall 19c. The second hook elements 19h on the interior walls 19c also hook water droplets 30 and allow them to fall into the drain.

From the second water extractor 19, further dehumidified condensed air 29 may exit, via the dehumidified outlet face 19b, and enter the reheater 14, via the dehumidified air inlet face 14c. In the reheater 14, the further dehumidified condensed air 29 may undergo heat exchange with the inlet air 17 and exit as the outlet air 13.

It should be understood, of course, that the foregoing relates to exemplary embodiments of the invention and that modifications may be made without departing from the spirit and scope of the invention as set forth in the following claims.

We claim:

1. A heat exchanger system, comprising
a reheater having:
a humidified air inlet face;
a humidified air outlet face;
a dehumidified air inlet face;
a dehumidified air outlet face;
a two-pass condenser having:
a reheated air inlet face, on a first pass, that directly interfaces the reheater humidified air outlet face;
a condensed air outlet face on the first pass;
a dehumidified air inlet face on a second pass;
a dehumidified air outlet face on the second pass;
a first water extractor having:
a condensed air inlet face that directly interfaces the condensed air outlet face of the first pass of the condenser;
a dehumidified air outlet face that directly interfaces the dehumidified air inlet face of the second pass of the condenser; and
a second water extractor having:
a condensed air inlet face that directly interfaces the dehumidified air outlet face of the second pass of the condenser;
a dehumidified air outlet face.

2. The system of claim 1, further comprising a core of cross flow passages in communication with the first and second water extractors.

3. The system of claim 1, wherein the reheater and condenser are both part of a single core of cross flow passages.

4. The system of claim 1, wherein a first pass of the condenser is directly downstream of the reheater.

5. The system of claim 1, wherein a first pass of the condenser is directly upstream of the first water extractor.

6. The system of claim 1, wherein a second pass of the condenser is directly downstream of the first water extractor.

7. The system of claim 1, wherein a second pass of the condenser is directly upstream of the second water extractor.

8. A heat exchanger system, comprising:
a core of cross flow passages having:
a reheater; and
a condenser that is downstream of and directly interfaces the reheater;
a first water extractor downstream of the condenser, wherein the first water extractor:
turns a first fluid from a first pass of the condenser back towards a second pass of the condenser; and
produces a second fluid that flows into the condenser; and
a second water extractor downstream of the second pass of the condenser, wherein the second water extractor:
turns a third fluid from the condenser towards the reheater; and
produces a fourth fluid that flows into the reheater.

9. The system of claim 8, wherein a reheated air inlet face of a first pass of the condenser directly interfaces a humidified air outlet face of the reheater.

10. The system of claim 8, wherein a condensed air inlet face of the first water extractor directly interfaces a condensed air outlet face of a first pass of the condenser.

11. The system of claim 8, wherein a dehumidified air outlet face of the first water extractor directly interfaces a dehumidified air inlet face of a second pass of the condenser.

12. The system of claim 8, wherein a condensed air inlet face of the second water extractor that directly interfaces a dehumidified air outlet face of a second pass of the condenser.

13. A heat exchanger system, comprising:
a core of cross flow passages having:
a reheater; and
a condenser that is downstream of and directly interfaces the reheater;
a first water extractor that is downstream of and directly interfaces the first pass of the condenser, wherein the first water extractor includes:
a plurality of first walls;
a plurality of first ramp elements on one side of the plurality of first walls; and
a plurality of first hook elements on an opposite side of the plurality of first walls;
a second water extractor that is downstream of and directly interfaces the second pass of the condenser, and is upstream of and directly interfaces the reheater, wherein the second water extractor includes:
a plurality of second walls;
a plurality of second ramp elements on one side of the plurality of second walls; and
a plurality of second hook elements on an opposite side of the plurality of second walls.

14. The system of claim 13, wherein the first water extractor turns a flow from the condenser about 180°.

15. The system of claim 13, wherein the first water extractor further includes a first outer wall radially positioned from the plurality of first walls, wherein the first outer wall includes another plurality of first hook elements.

16. The system of claim 13, wherein the plurality of first hook elements have a concave surface that faces opposite to a direction of flow from the condenser.

17. The system of claim 13, wherein the second water extractor turns a flow from the condenser about 90°.

18. The system of claim 13, wherein the second water extractor further includes a second outer wall radially positioned from the plurality of second walls, wherein the second outer wall includes another plurality of second hook elements.

19. The system of claim 13, wherein the plurality of second hook elements have a concave surface that faces opposite to a direction of flow from the condenser.

* * * * *